United States Patent
Quach et al.

(10) Patent No.: US 10,061,644 B2
(45) Date of Patent: Aug. 28, 2018

(54) SYSTEMS AND METHODS FOR IMPLEMENTING ERROR CORRECTING CODE IN A MEMORY

(71) Applicant: QUALCOMM INCORPORATED, San Diego, CA (US)

(72) Inventors: Nhon Quach, San Diego, CA (US); Mainak Biswas, San Diego, CA (US); Pranjal Bhuyan, Bangalore (IN); Jeffrey Shabel, San Diego, CA (US); Robert Hardacker, San Diego, CA (US); Rahul Gulati, Bangalore (IN); Mattheus Heddes, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 14/994,078

(22) Filed: Jan. 12, 2016

(65) Prior Publication Data
US 2017/0123897 A1 May 4, 2017

(30) Foreign Application Priority Data
Nov. 2, 2015 (IN) .......................... 5908/CHE/2015

(51) Int. Cl.
*G06F 12/00* (2006.01)
*G11C 29/52* (2006.01)
(Continued)

(52) U.S. Cl.
CPC ...... *G06F 11/1064* (2013.01); *G06F 11/1012* (2013.01); *G06F 12/08* (2013.01);
(Continued)

(58) Field of Classification Search
CPC ........... G06F 2212/401; G06F 11/1064; G11C 2207/102; G11C 7/1006
See application file for complete search history.

(56) References Cited

U.S. PATENT DOCUMENTS

| | | | | |
|---|---|---|---|---|
| 5,490,260 A | * | 2/1996 | Miller .................. | G06F 3/0601 711/100 |
| 7,162,583 B2 | * | 1/2007 | Adl-Tabatabai .... | G06F 12/0802 711/100 |

(Continued)

FOREIGN PATENT DOCUMENTS

WO    2013147819 A1    10/2013

OTHER PUBLICATIONS

International Search Report and Written Opinion—PCT/US2016/054532—ISA/EPO—dated Jan. 3, 2017.

*Primary Examiner* — Phung M Chung
(74) *Attorney, Agent, or Firm* — Smith Tempel Blaha LLC

(57) ABSTRACT

Systems and methods are disclosed for error correction control (ECC) for a memory device comprising a data portion and an ECC portion, the memory device coupled to a system on a chip (SoC). The SoC includes an ECC cache. On receipt of a request to write a line of data to the memory, a determination is made if the data is compressible. If so, the data line is compressed. ECC bits are generated for the compressed or uncompressed data line. A determination is made if an ECC cache line is associated with the received data line. If the data line is compressible, the ECC bits are appended to the compressed data line and the appended data line is stored in the data portion of the memory. Otherwise, the ECC bits are stored in the ECC cache and the data line is stored in the data portion of the memory.

30 Claims, 8 Drawing Sheets

(51) Int. Cl.
   *G06F 11/10*   (2006.01)
   *G06F 12/0888* (2016.01)
   *G06F 12/08*   (2016.01)

(52) U.S. Cl.
   CPC .. *G06F 12/0888* (2013.01); *G06F 2212/1032* (2013.01); *G06F 2212/1044* (2013.01); *G06F 2212/1056* (2013.01); *G06F 2212/281* (2013.01); *G06F 2212/401* (2013.01); *G06F 2212/466* (2013.01)

(56) References Cited

U.S. PATENT DOCUMENTS

| | | | |
|---|---|---|---|
| 7,340,666 B1 | 3/2008 | Wright et al. | |
| 8,122,216 B2 * | 2/2012 | Daly | G06F 12/08 711/151 |
| 9,342,453 B2 * | 5/2016 | Nale | G06F 13/1694 |
| 9,569,348 B1 * | 2/2017 | Deming | G06F 12/10 |
| 2008/0055323 A1 * | 3/2008 | Franaszek | G06F 12/0897 345/530 |
| 2011/0320913 A1 | 12/2011 | Stracovsky et al. | |

* cited by examiner

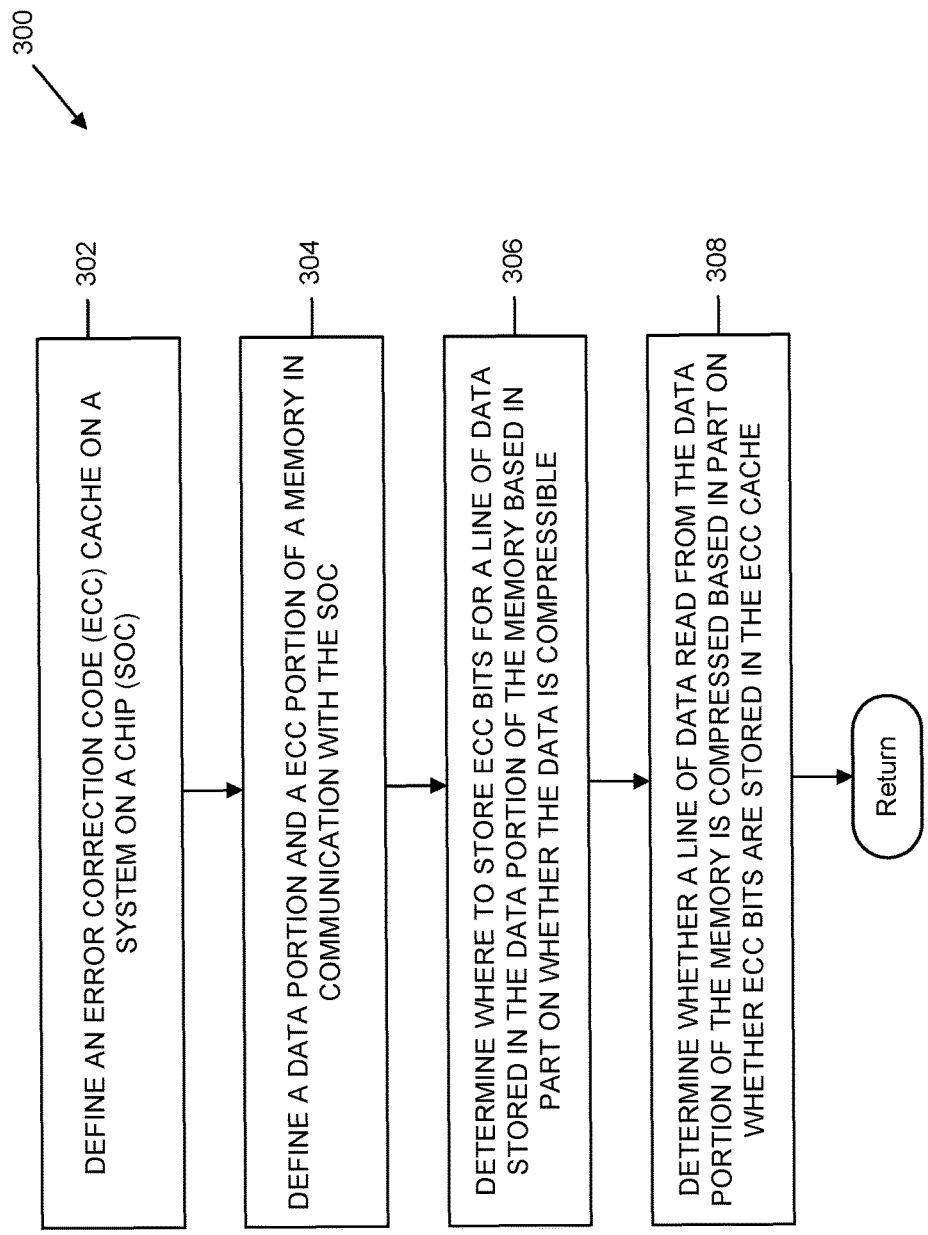

SYSTEMS AND METHODS FOR IMPLEMENTING ERROR CORRECTING CODE IN A MEMORY

PRIORITY CLAIM TO RELATED APPLICATION

This application claims priority under 35 U.S.C. § 119(b) to Indian Patent Application No. 5908/CHE/2015, filed Nov. 2, 2015, entitled, "SYSTEMS AND METHODS FOR IMPLEMENTING ERROR CORRECTING CODE IN A MEMORY." The entire contents of this Indian Patent Application are hereby incorporated by reference.

DESCRIPTION OF THE RELATED ART

Computing devices comprising at least one processor coupled to a memory are ubiquitous. Computing devices may include personal computing devices (e.g., desktop computers, laptop computers, cellular telephones, smart phones, tablet computers, portable digital assistants (PDAs), and portable game consoles), or may be included as components of larger products (e.g. appliances, automobiles, airplanes, military or construction equipment, etc.). Various products containing computing devices may be subject to regulations or standards that set requirements for the memory used in the product, including the use of error correcting code (ECC) for the memory, such as a DDR (double-data rate) DRAM (dynamic random access memory). One example of such a standard is ISO 26262, a functional safety standard for automobiles, entitled "Road vehicles—Functional safety," which sets standards and requirements for memories used in automotive electric/electronic systems, including the use of ECC in the DDR DRAM memory.

In order to meet these standards or regulations (such as ISO 26262) DDR DRAM memory may be custom designed to meet the particular requirements for the product and/or application in which the DDR DRAM memory may be used. However, such customized DDR DRAM memory is costly to design and manufacture. Additionally, trying to use convention memory to meet the standards or regulations may also be costly, especially where the standards require a non-standard memory size and/or memory interface width along with the requirement for ECC.

Accordingly, there is a need for improved systems and methods to implement ECC in the memory of computing devices, and especially a need for such improved systems and methods to implement ECC in memory used in a computing device that is part of an automotive electric and/or electronic system.

SUMMARY OF THE DISCLOSURE

Systems, methods, and computer programs are disclosed for implementing error correction control (ECC) in a memory such as a DDR DRAM/LPDDR (Low Power DDR) DRAM in communication with a system on chip (SoC). The memory is partitioned into a data portion and an ECC portion. The SoC includes an ECC cache. Upon receipt by a component of the SoC of a request to write a line of data to the memory, a determination is made if the received line of data is compressible. A determination is also made if there is a hit or a miss in the ECC cache for the received data line. If the data line is compressible, it is compressed, and ECC bits are generated for the compressed data line, and the appended compressed data line is stored in the data portion of the memory. Additionally, responsive to a hit for the ECC cache, the cache line of the ECC cache associated with the received data line is deleted. On an ECC cache miss, a determination is made whether to delete a line of the ECC portion of the memory device associated with the received data line.

If the received data line is not compressible, the data line is stored in the data portion of the memory device and the generated ECC bits are written to the ECC cache. Writing the generated ECC bits may comprise, responsive to a hit for the ECC cache, replacing the cache line of the ECC cache with the generated ECC bits; or responsive to a miss for the ECC cache, a determination is made whether to first evict a cache line from the ECC cache if the ECC cache is full, before writing the generated ECC bits to the ECC.

Upon receipt of a read request for a stored data line in the memory device, a determination of a read hit or a read miss for the ECC cache associated with an address of the stored data line. Responsive to a read hit, ECC data in the ECC cache associated with the address of the stored data line is used for an ECC check of the stored data line. On an ECC cache miss, the ECC portion of the memory device is checked for a valid bit associated with the stored data line. Responsive to the valid bit being located in the ECC portion, using an ECC data in the ECC portion of the memory device for the ECC check. Responsive to the valid bit not being located in the ECC portion, ECC data appended to the stored data line for the ECC check and the stored data line is decompressed after the ECC check.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 3 is a flowchart illustrating an embodiment of a method for providing improved ECC for a memory in communication with an SoC;

DETAILED DESCRIPTION

Figure 1:
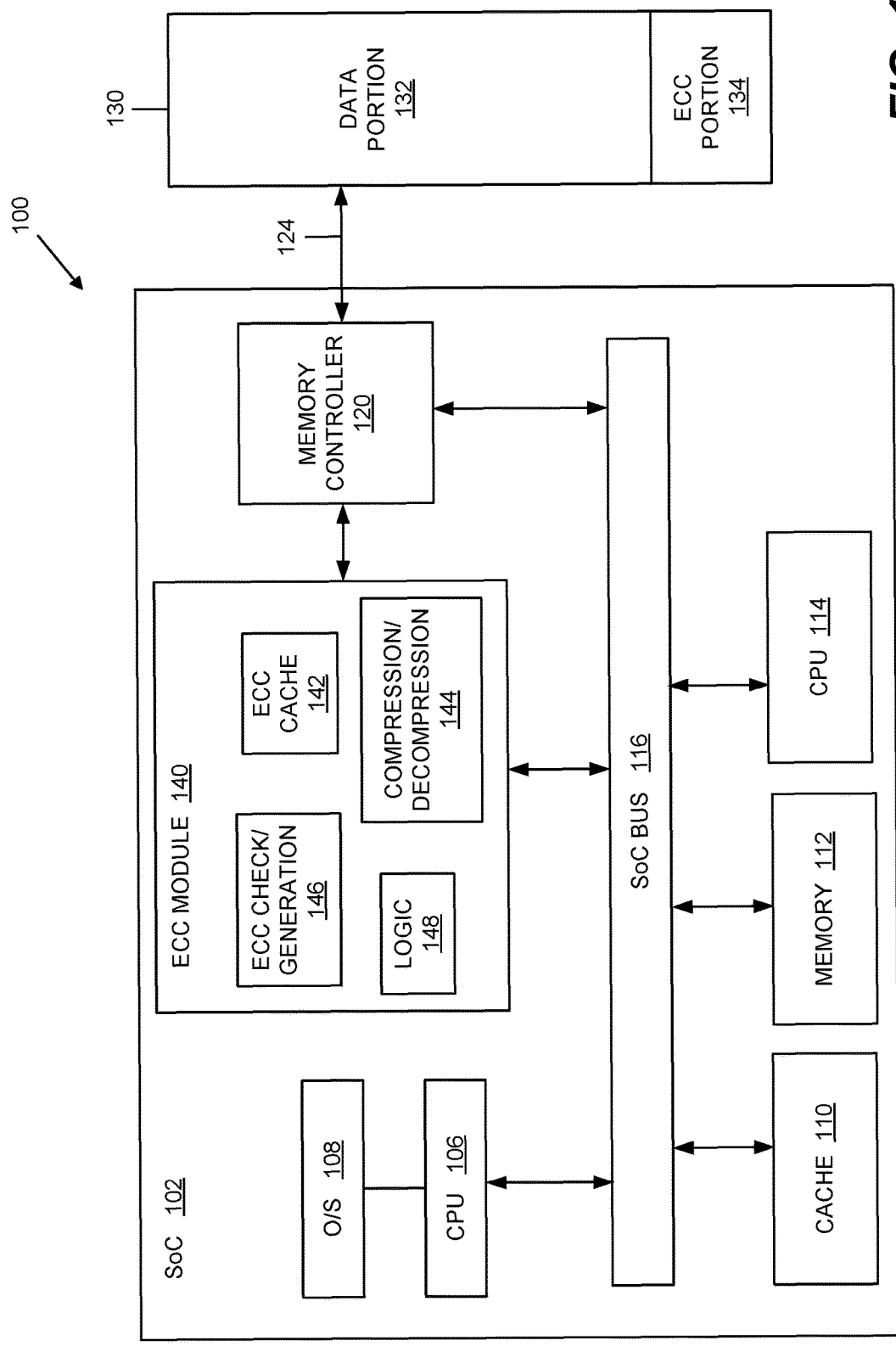
FIG. 1 is a block diagram of an embodiment of a system for implementing error correction control (ECC) in a memory in communication with a system on chip (SoC) of an exemplary computing device.

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "computing device" is used to mean any device implementing a processor (whether analog or digital) in communication with a memory, whether the computing device is a "stand alone" device such as a computer (including desktop computers, servers, laptop computers, handheld computers, tablets, etc.). "Computing device" also includes a processor in communication with a memory that is a part, portion, or component of a larger product, such as appliances, automobiles, airplanes, military or construction equipment, etc. A "computing device" may also be a "portable computing device" (PCD) and the terms PCD, "communication device," "wireless device," "wireless telephone", "wireless communication device," and "wireless handset" are used interchangeably herein. With the advent of third generation ("3G") wireless technology and four generation ("4G"), greater bandwidth availability has enabled more portable computing devices with a greater variety of wireless capabilities. Therefore, a portable computing device may also include a cellular telephone, a pager, a PDA, a smartphone, a navigation device, or a hand-held computer with a wireless connection or link.

Memory accesses in computing devices (CDs), and especially memory accesses by a system on a chip (SoC) and a memory located external to the SoC ("off chip") are typically performed by a high performance access channel. Data is transferred between a processor (or another component of the CD) and a memory device over the access channel. A variety of standards, protocols, or technologies may be used to perform the transfer of the data and this disclosure is not limited to any particular data transfer standard. Additionally, the memory devices discussed herein may be any memory device, such as for example a dynamic random access memory (DAM) like a double data rate synchronous dynamic (DDR) RAM according to one of the DDRx or LPDDRx (Low Power DDR) standards.

Typically used in desktops and servers, DDR DRAM memory devices have an IO (input/output) data bus width of 4 bits (×4) or 8 bits (×8). LPDDR DRAM memory devices have an IO data bus width of 16 bits (×16) and 32 bits (×32). Additionally, the size of the data bus width between the computing device and the DRAM memory in a channel also varies. For desktop computers, the data bus width is 64 bits per channel, requiring up to 8 pieces of ×8 b DDR DRAM memory devices. For servers, the data bus width is 64 bits per channel, requiring up to 16 pieces of ×4 DDR DRAM memory devices or 8 pieces of ×8 b DDR DRAM memory devices. For tablets, cellphones, and automotive, the data bus width is 32 bits, requiring two pieces of ×32 b or a single piece of ×32 b (or a 2×16 b) LPDDR DRAM memory device(s).

Memory devices in communication with an SoC may also be protected by error correcting/correction code (ECC). ECC comprises extra bits sent or stored with the data being stored on the memory that assist in detecting transmission or other errors when the data stored on the memory is read or retrieved from the memory. In typical computing devices the memory device is sized to store the ECC bits in addition to the data being held by the memory device. Similarly, the bandwidth of the memory device access channel is may be sized to allow for the transmission of the ECC bits along with the data being sent to/retrieved from the memory device. For example, some computing devices use memory devices comprising dual in-line memory module (DIMM) with 8 pieces of ×8 b memory for data storage and 1 piece of ×8 b memory for ECC storage. Such 9×8 b DIMMs may be coupled to the SoC or processor with a 72 bit memory access channel using 64 b for data and 8 b for ECC.

However, some applications or products in which a memory device is used may not allow for such conventional memory/memory access channel arrangements. For example, ISO 26262 is a functional safety standard for automobiles, entitled "Road vehicles—Functional safety," which sets standards and requirements for memory devices used in automotive electric/electronic systems, including the use of ECC in the memory. Some of these requirements are found in Automotive Safety Integrity Level (ASIL)-A through ASIL-D which define varying integrity and performance levels required for memory devices to comply with ISO 26262. Under these standards, more common ×8 b memory are not permitted, but instead a 2×16 b memory is required (and a 32 b memory access channel), along with ECC. Rather than allowing manufacturers to add another ×8 b memory for the ECC bit storage (and another 8 bits to the channel) as commonly done for other applications, the requirements in ASIL-A through ASIL-D force the implementation of a second piece of 2×16 b memory (and another 32 bit channel) in order to provide ECC for the memory device. As will be understood, the same problem is faced in any computing device (e.g. a tablet or cellphone) where the data bus is 32 bits with a single ×32 b or 2×16 b memory such as LPDDR DRAM. For such computing devices, supporting ECC requires adding another ×32 b or 2×16 b memory device, doubling the cost.

In any type of DDR DRAM memory devices, information content is stored in the form of electrons in tiny capacitors inside the DDR DRAM memory devices. The presence of the electrons is interpreted as a data value of "1" and the absence of the electrons as a data value of "0". These electrons can leak over time, leading to data corruption. Hence, DDR DRAM memory devices need to perform self-refresh to replenish the electrons to avoid data corruption. During self-refresh, the DDR DRAM memory device is not available for service, reducing its overall bandwidth. Furthermore, the higher the temperature, the more often the self-refresh operation and hence the higher the overhead. Because of the need of self-refresh, providing ECC with another DDR DRAM device as described above in the case of automotive, tablets, and cellphones will also roughly double the overhead due to the need to perform self-refresh to both DDR DRAM memory devices since the self-refresh operations are not synchronized.

The system and methods of the present disclosure implement an ECC cache on, or in communication with, the SoC and/or implement compression to compress data stored on the memory device so that the ECC bits may be stored along with the compressed data in the memory device in order to avoid the extra storage and/or memory access channel width required for ECC. In this manner, the systems and methods allow for both the data and the ECC to be implemented in a single 2×16 b piece of memory and a 32 b memory access channel—in compliance with ASIL-A through ASIL-D—rather than the commonly used two pieces of 2×16 b memory and 64 b memory access channels.

The savings from being able to meet these automotive standards with a single piece of LPDDR4 RAM memory (for example) rather than two pieces LPDDR4 RAM memory by implementing the present systems and methods are considerable. In addition to the significant $1-$2 cost savings using one piece of RAM rather than two pieces, using one piece of RAM is estimated to provide a net bandwidth reduction of 15% due the bandwidth savings of only having to refresh a single piece of memory rather than two pieces. The bandwidth reductions/savings are even more pronounced in certain applications like automotive were the increased operating temperatures require higher refresh rates for the memory, including four times higher. These bandwidth reductions are realized even with the additional latency from compression and the potential traffic of ECC bits to the memory device for uncompressible data as discussed below. Similarly, there are savings in silicon area, such as pads no longer needed to support the second piece of RAM memory as well as packaging savings in terms of bumps and balls no longer needed that also represent significant reductions in materials and manufacturing costs.

Although discussed herein in relation to computing devices used in automotive electronics, such as for compliance with the ASIL-A through ASIL-D standards, the systems and methods herein—and the considerable savings made possible by the systems and methods—are applicable to any computing device, including portable computing devices (PCDs).

FIG. 1 illustrates an embodiment of a system 100 for implementing error correction control (ECC) in a memory device 130 in communication with a system on chip (SoC) 102. The system 100 may be implemented in any computing device, including a personal computer, a workstation, a server, a portable computing device (PCD), such as a cellular telephone, a portable digital assistant (PDA), a portable game console, a tablet computer, or a wearable computer. The system 100 may also be implemented in a computing device that is a portion/component of another product such as an appliance, automobile, airplane, construction equipment, military equipment, etc.

As illustrated in the embodiment of FIG. 1, the system 100 comprises an SoC 102 electrically coupled to an external or "off chip" memory device 130. The SoC 102 comprises various on-chip components, including a central processing unit (CPU) 106, a memory controller 120, a cache 110 memory, a system memory 112, all interconnected via a SoC bus 116. In some embodiments, such as the one illustrated in FIG. 1, the SoC 102 may also include one or more additional processors like CPU 114 also connected to the SoC bus 16.

The CPU 106 may be controlled by or execute an operating system (OS) 108 that causes the CPU 106 to operate or execute various applications, programs, or code stored in one or more memory of the computing device. In some embodiments the CPU 106 and CPU 114 may be the same type of processor, while in other embodiments the CPU 114 may be a digital signal processor (DSP), a graphics processing unit (GPU), an analog processor, or other type of processor different from CPU 106 executing the OS 108.

The cache 110 memory of FIG. 1 may be an L2, L3, or other desired cache. Additionally the cache 110 may be dedicated to one processor, such as CPU 106, or may be shared among multiple processors in various embodiments, such as the CPU 106 and CPU 114 illustrated in FIG. 1. In an embodiment, the cache 110 may be a last level cache (LLC) or the highest (last) level of cache that the CPU 106 calls before accessing a memory like memory device 130.

System memory 112 may be a static random access memory (SRAM), a read only memory (ROM) 112, or any other desired memory type, including a removable memory such as an SD card. The SoC 102 may include one or more memory clients that request memory resources from memory device 130 located external to the SoC 102 or "off chip." The memory clients may comprise one or more processing units (e.g., CPU 106, a GPU, a DSP, etc.), a video encoder, or other clients/components of the SoC 102 requesting read/write access to the memory device 130.

The SoC 102 further includes a memory controller 120 electrically connected to the SoC bus 116 and also connected to the memory device 130 by a memory access channel 124 which may be a serial channel or a parallel channel in various embodiments. Memory controller 120 manages the data read from and/or stored to the various memories accessed by the SoC 102 during operation of the system 100, including memory device 130 illustrated in FIG. 1. In the illustrated embodiment of FIG. 1, the memory controller 120 may include other portions not illustrated such as a read and/or write buffer, control logic, etc., to allow memory control 120 to control the data transfer over the memory access channel 124. In various implementations, some or all of the components of the memory controller 120 may be implemented in hardware, software, or firmware as desired.

The memory device 130 interfaces with the SoC 102 via a high-performance memory bus comprising an access channel 124, which may be any desired width. The memory device 130 may be any volatile or non-volatile memory, such as, for example, DRAM, flash memory, flash drive, a Secure Digital (SD) card, a solid-state drive (SSD), or other types. In an embodiment, the memory device 130 is a DDR DRAM or a LPDDR DRAM. Additionally, as further illustrated in FIG. 1, memory device 130 may be partitioned into a data portion 132 for storing the data written to the memory device 130, and an ECC portion 134 for storing ECC bits or information for some (or all) of the data written to the data portion 132 of the memory device 130.

In an embodiment, the ECC portion 134 of the memory device 134 may be sized to allow all of the ECC data associated with data written to the data portion 132 of the memory device 130 to be stored in the ECC portion 134. In an implementation, the ECC portion 134 may comprise 1.5-3% of the storage space of the memory device 130. Note that in some embodiments the ECC portion 134 may not be a portion of the memory device 130, but may instead comprise a separate memory (or portion of a separate memory), either on the SoC 102 such as memory 112, or an additional "off chip" memory in communication with the SoC 102 (not illustrated).

As will be understood, the memory device 130 may be a dual in-line memory module (DIMM) comprised one or more memory arrays arranged within the memory device 130 to store data. These memory arrays may be arranged in ranks in some embodiments as would be understood. In an embodiment, the memory device 130 may be a LPDDR4 2×16 memory device 130 with a 32 b access channel 124, and such memory device 130 may comply with ISO 26262 and/or one or more of ASIL-A through ASIL-D. However, other types and configurations of the memory device 130 may be implemented in the system 100 in other embodiments.

As will also be understood, the memory device 130 may be used to store any type of data desired and may be written to/read from by any component or memory client of the SoC 102 requesting access to the memory device 130. In an embodiment, the memory device 130 may be written to/read from by the cache 110 which may be an LLC. In such embodiments, 128 b, 64 b, 32 b, 16 b, or any other sized cache lines may be written from the cache 110 to the data portion 132 of the memory device 130 in varying implementations as desired. Additionally, as discussed below, the ECC information or bits associated with these cache lines may be written to the memory device in the data portion 132 of the memory device 130 (if the cache line is compressible) or in one of the ECC cache 142 or ECC portion 134 of the memory device 130 (if the cache line is not compressible). Note that data portion 132 and ECC portion 134 are referred to herein as portions or partitions of a single memory device 130. It will be understood that in some embodiments, the ECC portion 134 may instead be located in a separate memory device 130' (not shown in FIG. 1) than the memory device 130 with the data portion 132. This separate memory device 130' with or containing the ECC portion 134 may, in some embodiments, be a different type of memory than the memory device 130 with the data portion 132.

The SoC 102 of the system 100 also includes an ECC module 140 connected to the memory controller 120 as well as to the SoC Bus 116. In the illustrated embodiment, the ECC module 140 includes an ECC cache 142, a compression and/or decompression module, engine, or functionality (compression module) 144, an ECC check and/or generation module, engine, or functionality (ECC check) 146, and logic 148. In other implementations, the ECC module 140 may contain more or fewer components. Similarly, as would be understood, in some implementations the ECC module 140 may not be a separate module on the SoC 102, but instead one or more of the portions or functions of the illustrated ECC module 140 may be contained in, or performed by, other portions of the SoC 102, such as for example memory controller 120. Additionally, as would be understood, in various implementations, some or all of the components or functions of the ECC module 140 may be implemented in hardware, software, or firmware as desired.

The ECC cache 142 stores ECC bits or information associated with data stored in the data portion 132 of the memory device 130 as discussed below. The ECC cache 142 may be implemented as a dedicated cache memory, or may be a portion or partition of another memory on the SoC 102 such as cache 110. In an embodiment, the ECC cache 142 is a standard cache known in the art and is sized to hold most, or all, of the ECC bits or information associated with the amount of expected uncompressible data that is stored in the data portion 132 of the memory device 130 as discussed below. In different implementations, the ECC cache 142 may vary from 256 kb-512 kb in size and may be located between the cache 110 and the memory controller 120.

The ECC check 146 generates ECC bits or information for data stored in/written to the data portion 132 of memory 130 and/or performs error checking for data stored in/read from the data portion 132 of the memory 130 (using ECC bits or information associated with the data. In an embodiment, the ECC check 146 may be a single component or logic that performs both the ECC generation and the error checking. In other embodiments the ECC check 146 may comprise separate components or logic, one for performing ECC generation and another for performing error checking. However implemented, the ECC check 146 may generate ECC bits for and/or perform error correction according to any desired ECC method. For example, the ECC check 146 in various embodiments may implement single error correction-double error detection (SEC-DED), double error correction-triple error detection (DEC-TED), etc.

The compression module 144 determines if data written to the memory device 130 is compressible, and if so, compresses the data before it is written to the data portion 132 of the memory device 130. In an embodiment the compression module 144 may also send a signal to another component such as logic 148 or otherwise alert the ECC module 140 whether a particular data line being written to the memory device 130 is, or is not, compressible as discussed below. The compression module 144 also decompresses any compressed data that is read from the data portion 132 of the memory device 130 as discussed below.

In an embodiment, the compression module 144 may be a single component or functionality that performs both the compression and the decompression. In other embodiments the compression module 144 may comprise separate components or functionalities, one for performing compression and another for performing decompression. However implemented, the compression module 144 may use any desired compression method or algorithm. In an embodiment, the compression module 144 uses lossless compression, which may be implemented using the Real-Time Transport Protocol (RTP) lossless compression or header compression. However other lossless compression algorithms or methods may be used in other embodiments.

Logic 148 may be implemented as hardware, software, or firmware as desired and may be a standalone logic 148 module in some embodiments that receives or monitors various signals and/or counters, and makes various determinations or decisions discussed below. In other embodiments, logic 148 may comprise multiple logical components or circuitry, such as "glue logic," that may each be used to monitor one or more signals or counters and/or make one or more of the determinations or decisions discussed below.

In another embodiment (not illustrated in FIG. 1), more than one ECC module 140 may be implemented on the SoC 102, operating in parallel. For such embodiments, the different ECC modules 140 may be configured to handle different sized write/read requests. For example, in an implementation, a first ECC module 140 may be configured with a first ECC cache 142 of a first size and operate as discussed above to write/read 128 b data lines (such as from cache 110) to the memory device 130. A second ECC module 140' (not illustrated) may be configured with a second ECC cache 142' of a second size and operate as discussed above to read/write 64 b (or any other size) data lines to the memory device 130 and/or to a second memory device 130'. For such multiple ECC module 140 embodiments, it is not necessary that each of the different ECC modules 140/140' have the same number or, or same configurations of, components discussed above or illustrated in FIGS. 1 and/or 2A-2B.

Turning to FIG. 3, a flowchart an embodiment of a method 300 for providing improved ECC for a memory in communication with an SoC is illustrated. In an embodiment, the method 300 may be implemented by a system such as system 100 of FIG. 1. In block 302, an ECC cache 142 is provided or defined on an SoC 102, such as discussed above for FIG. 1. In block 304, a data portion 132 and ECC portion 134 are defined or provided for a memory, such as memory device 130, in communication with the SOC 102. Block 304 may be implemented for example, by the data portion 132, ECC portion 134, and memory device 130 in communication with the SoC 102 of FIG. 1.

In block 306, a determination is made where to store ECC bits or information associated with a line of data being stored on/written to the data portion 132 of the memory, such as memory device 130. As discussed above for FIG. 1, the data being written to the data portion 132 of the memory may be a cache line, such as from cache 110 of the SoC 102, and may be a 128 b, 64 b, 32 b, or other sized cache line written to the memory device 130 in various embodiments.

Figure 2A:
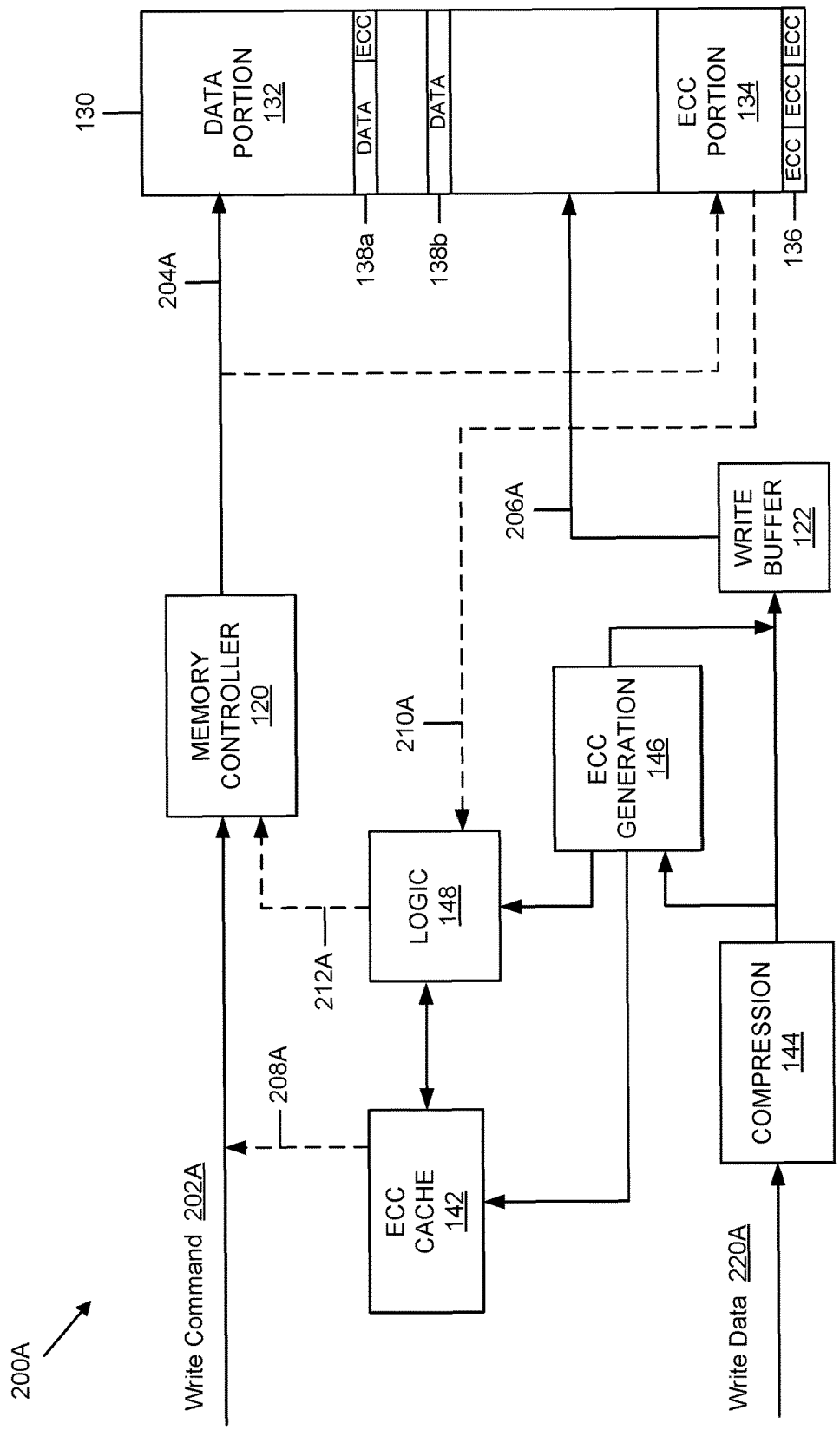
FIG. 2A is a functional diagram showing the interaction of portions of the system of FIG. 1 during a write operation to the memory in communication with the SoC.
Figure 4:
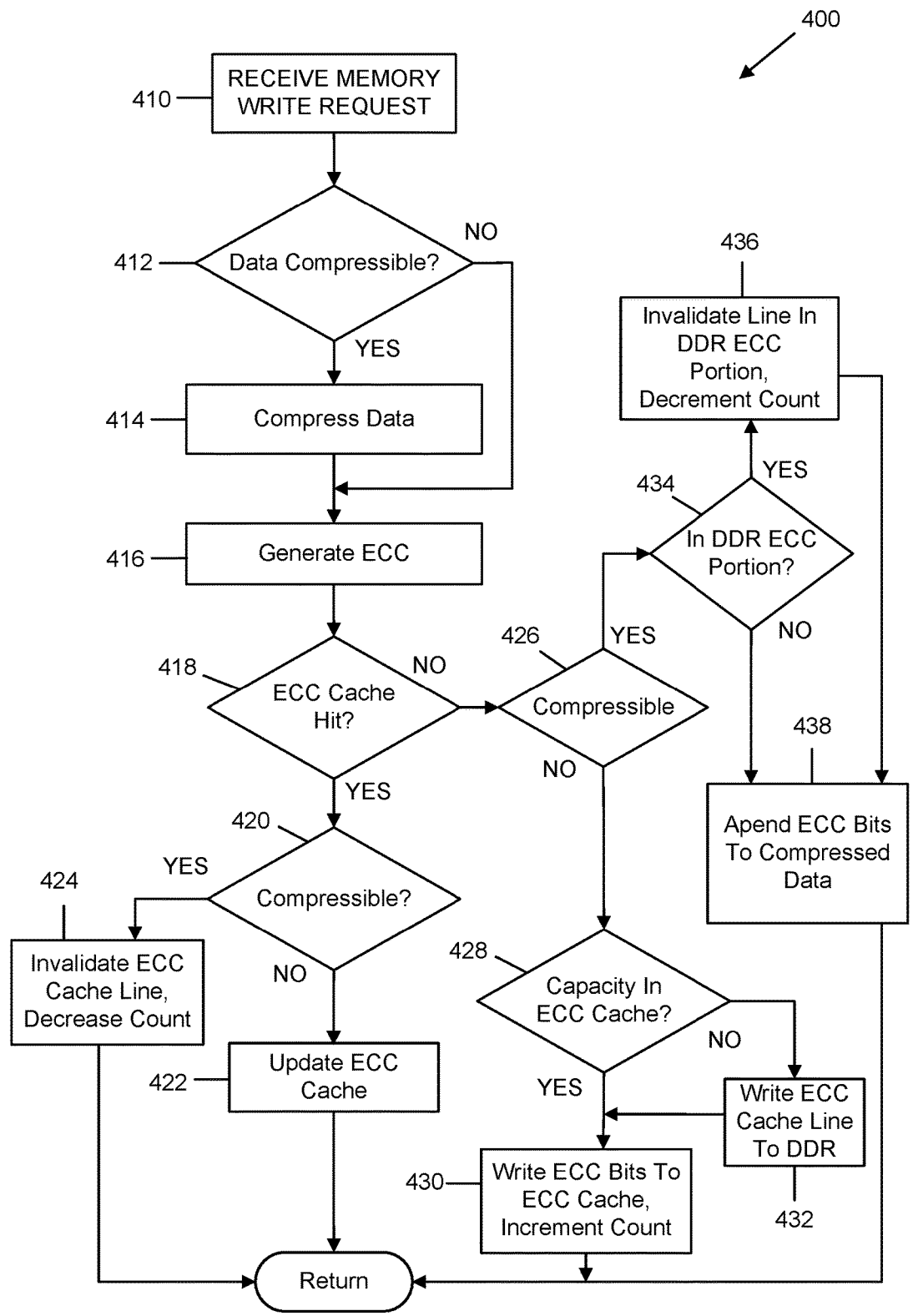
FIG. 4 is a flowchart illustrating an embodiment of a method for providing ECC data for a write operation to the memory in communication with the SoC.

Additional details for block 306 are shown in FIGS. 2A and 4 (discussed below). At a high level, the determination in block 306 is based at least in part on a determination whether the data being written to the memory device 130 is compressible. For example, as illustrated in FIG. 2A, for data lines that are determined to be compressible, such as by compression module 144, the data line may be compressed by the compression module 144, and the ECC bits associated with the data line may be generated after compression by ECC check 146. The ECC bits may then be stored along with the compressed data line in the data portion 132 of the memory device 130.

Alternatively, for data lines that are determined not to be compressible by compression module 144, ECC bits associated with the data line may be generated, and the data line may be stored in uncompressed form in the data portion 132 of the memory module. The ECC bits may then be stored in the ECC cache 142, or in the ECC portion 134 of the memory device 130, with a preference for the ECC cache 142. Additional details for block 306 are discussed below for FIGS. 2A and 4.

Turning to block 308, a determination is made whether a line of data read/retrieved from the memory, such as from data portion 132 of memory device 130, was previously compressed. Additional details for block 308 are discussed below for FIGS. 2B and 5. However, at a high level, the determination of block 308 is based at least in part on whether the ECC bits or information associated with the retrieved data are stored in the ECC cache 142. For example, if ECC bits for the retrieved data are found in the ECC cache 142 or in the ECC portion 134 of the memory device 130, it is known that that the data was stored in the memory device 130 in an uncompressed form, and the located ECC bits may be used for any error correction by ECC check 146. The data retrieved from the data portion 132 of the memory device 130 is then returned in response to the read request.

Alternatively, if ECC bits for the retrieved data are not found in the ECC cache 142 or the ECC portion 134 of the memory device 130 in block 308, it is known that the data was previously compressed and the ECC bits stored with the compressed data in the data portion 132 of the memory device 130 are used by the ECC check 146 for error correction. The retrieved data is then decompressed, such as by compression module 144, and returned in response to the read request.

Figure 2B:
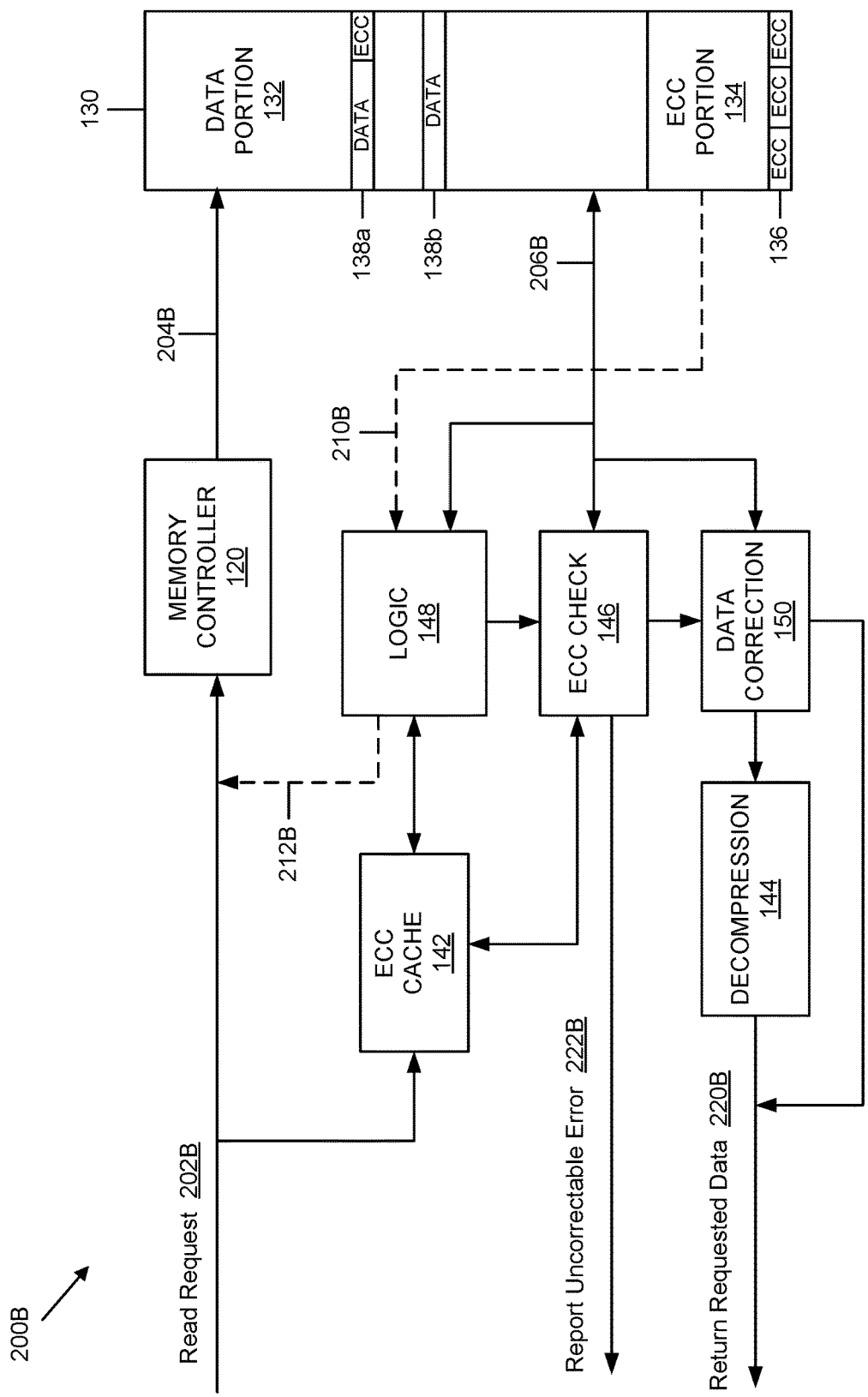
FIG. 2B is a functional diagram showing the interaction of portions of the system of FIG. 1 during a read operation from the memory in communication with the SoC.

FIGS. 2A-2B are functional diagrams showing the interaction of portions of the system 100 of FIG. 1 during a write operation (FIG. 2A) and a read operation (FIG. 2B) operation to a memory, such as the memory device 130 in communication with the SoC 102. The number and arrangement of components in FIGS. 2A-2B is illustrative and not limiting. In some embodiments one or more of the components illustrated as separate in FIG. 2A or 2B may instead comprise a single larger component (such as ECC module 140 of FIG. 1). Some, or all, of the components illustrated in FIG. 2A may be used to perform block 306 of FIG. 3 discussed above; while some or all of the components illustrated in FIG. 2B may be used to perform block 308 of FIG. 3.

Turning to the embodiment illustrated in FIG. 2A, a write command 202A is received by the memory controller 120. The write command 202A may be from any component of the SoC 102 and may be from cache 110 illustrated in FIG. 1 in an embodiment. In the exemplary embodiment, the write command 202A may be a command to write a cache line, such as a 128 b or other sized cache line, to the memory device 130. The data to be written, write data 220, is also received. In the illustrated embodiment, the write data 220 is received by compression module 144.

Compression module 144, or logic 148 in communication with compression module 144, may determine whether the write data 220A is compressible, and if so will compress the write data 220A. In an implementation where the compression module 144 makes the determination whether the write data 220A is compressible, the compression module 144 may send a signal or otherwise alert logic 148 whether the write data 220A was compressible. ECC bits or information are then generated by ECC generation 146 (ECC check of FIG. 1).

The ECC bits are generated for the compressed write data 220A (if compressible) or the uncompressed write data 220A (if uncompressible). ECC bits generated for compressible data are then embedded or appended to the compressed write data 220A and the combined compressed write data 220A and ECC bits are forwarded to the write buffer 122 where the combined data/ECC bits 138a are written to the data portion 132 of the memory device 130. In this manner, the combined compressed data/ECC bits 138a may be transferred over memory access channel 206A and stored in one data line 138a of the data portion 132 (such as a single ×32 b or 2×16 b memory) without the need for additional memory access channel or additional storage space for the ECC bits (e.g. without the need for a second ×32 b or 2×16 b memory). Since the estimates are that the vast majority (95%+) of the data sent to the memory device 130 will be compressible, the present systems 100 and 200A-200B allowing for this data to be stored, and for ECC, in a single memory device 130 using a single memory access channel 206A represent a significant improvement over prior systems.

Alternatively, ECC bits generated for uncompressible write data 220A are not appended to the write data 220A. The uncompressed write data 220A is forwarded to the write buffer 122 and the stored as uncompressed data 138b (without ECC bits) in the data portion 132 of the memory device. Write buffer 122 may be a portion or component of the memory controller 120 in some embodiments.

The logic 148 will also check the ECC cache 142 for ECC bits associated with the received write date 220A. Based on an ECC cache 142 hit/miss and the determination whether or not the write data 220A was compressible, the logic may cause (if the write data 220A was incompressible) the new ECC bits from the ECC generation 146 to be written to the ECC cache 142, or as ECC data 136 in the ECC portion 134 of the memory device 130 as discussed below. The logic 148 may also cause (dotted line 212A) the memory controller 120 to retrieve ECC data 136 from the ECC portion 134 (dotted line 210A) or may cause the ECC cache 142 to eject ECC bits (dotted line 208A) that may then be stored as ECC data 136 in the ECC portion 134 of the memory device 130.

Turning to FIG. 2B, a functional diagram showing the interaction of portions of the system 100 of FIG. 1 during a read operation is illustrated. In this embodiment, a read request 202B is received by the memory controller 120. The read command 202B may be from any component of the SoC 102 and may be from cache 110 illustrated in FIG. 1 in an embodiment. In the exemplary embodiment, the read command 202B may be a command to read one of data lines 138a or 138b stored in the data portion 132 of the memory device 130. As part of receiving the read request 202B a determination is made, such as by logic 148, whether there is an ECC cache 142 hit for the data line 138a, 138b sought by the read request 2B.

If there is a hit in the ECC cache 142 for the memory line sought (line 138b for example) it is known that the retrieved data line is not compressed and the uncompressed data line 138b is retrieved (line 206B). An ECC check 146 is performed using the ECC bits from the ECC cache 142. If there is a correctable error detected by ECC check 146, it may be corrected (data correction 150) and the retrieved date is returned 220B without decompressing. If there is an uncorrectable error detected by ECC check 146, that error is reported 222B and the requested data is not returned.

In this manner uncompressible memory lines 138b may also be stored in a single memory device 130, and transferred between the SoC 102 and the memory device 130 (such as a single ×32 b or 2×16 b memory device 130)—and ECC may be provided—without the need for a second ×32 b or 2×16 b memory device 130 or a second memory access channel 206A/206B. As mentioned, the estimates are that the vast majority (95%+) of the data sent to the memory device 130 will be compressible. Thus, only a small portion of the data sent will not be compressible.

By sizing the ECC cache 142 to properly with respect to the size of the uncompressed data lines 138b written to the memory device—e.g., 256 k-512 k ECC cache 142 for a 128 b data line—the present systems 200A-200B are estimated to be able to store enough of the ECC bits in the ECC cache 142 to ensure an ECC cache 142 hit rate in excess of 95%. Thus, since the vast majority of the data will be compressed and stored with the ECC bits appended to the data in data lines 138a as discussed above, and the ECC bits for almost all of the (small amount of) uncompressible data will be stored in the ECC cache 142 on the SoC 102, the present systems 100 and 200A-200B ensure that only a very small fraction of the data lines stored on the memory device 130 also have ECC bits stored on the memory device 130. In this manner the present systems 100 and 200A-200B avoid and/or minimize any need to store ECC bits separately on the memory device 130 and, consequently avoid/minimize any performance hit to the memory access channel 124 (FIG. 1), 206A/206B (FIGS. 2A-2B) from having to read the ECC bits in the ECC portion 134 of the memory device 130.

If there is not a hit from the ECC cache 142 for the memory line sought, the logic 148 may cause (dotted line 212B) ECC data 136 to be retrieved (dotted line 210B) from the ECC portion 134 of the memory device 130. If there is ECC data 136 associated with the requested data line, line 138b for instance, those ECC bits are used by ECC check 146 to perform any error correction needed (data correction 150), report any uncorrectable errors 222B and return the requested data 220B without decompression.

Alternatively, if there is a miss in the ECC cache 142 and there is no ECC data 136 in the ECC portion 134 for requested data line, line 138a for example, it is known that the data line 138a is compressed. The data line 138a is retrieved 206B and the ECC bits from the data line 138a are used by the ECC check 146 to perform any data correction needed (data correction 150) or report any uncorrectable errors 222B. The corrected data (or uncorrected if no correction necessary) is then decompressed 144 and the decompressed data is returned 220B.

Figure 2C:
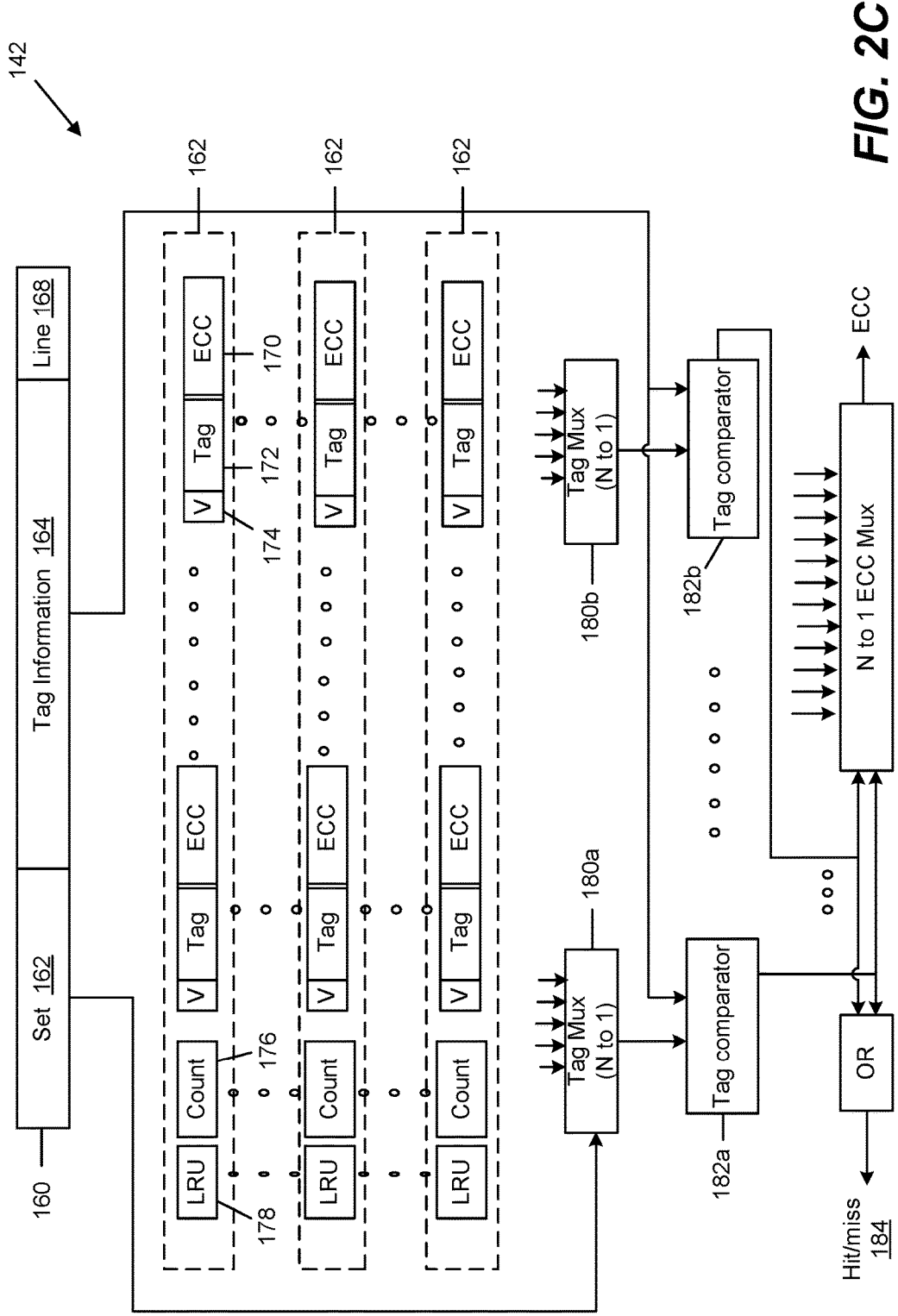
FIG. 2C is a block diagram illustrating aspects of an embodiment of an ECC cache that may be used in the systems of FIGS. 1 and 2A-2B and/or the methods of FIG. 3-5.

FIG. 2C illustrates aspects of an exemplary ECC cache 142 that may be implemented in FIGS. 1 and 2A-2B above and/or in the methods 3-5. As illustrated in FIG. 2C, the ECC cache 142 may be organized into a series of N data lines 160 where N is determined according to the size of the memory device 130 associated with the ECC cache 142. Each data line 160 may contain sets 162, tag information 164 and a line bit 168. Each set 162 may further comprise a plurality memory location or registers for storing ECC bits 170, a tag 172 for each memory location nor register associated with the ECC bits 170 stored at that memory location (if any), and a "v" bit 174 for each memory location or register associated with of the ECC bits 170 stored at that location (if any).

Each of the plurality of ECC bits 170 will correspond to one uncompressed data line 138b stored in the data portion 132 of the memory device 130 (See FIGS. 2A-2B). Each v bit 174 will be an indicator that the particular memory location or register associated with the v bit 174 contains ECC bits 174. The v bit 172 may be "off" when there are no ECC bits 170 stored in the particular memory location or register, and the v bit 174 may be "set" or "turned on" when ECC bits 170 are stored in the particular memory location or register. Thus, the v bit 172 may allow for a determination of how "full" the ECC cache 142 is and/or a determination of the remaining capacity of the ECC cache 142 to store ECC bits 170 as discussed below.

Each set 162 may also include one LRU indicator 178 indicating a least recently used (LRU) of the ECC bits 170 in the set. The LRU indicator 178 may be used when evicting data from the ECC cache 142. For embodiments where a method other than LRU eviction of data is implemented, the LRU indicator 178 may be a different indicator and/or a different indicator may be used in place of, or along with, the LRU indicator 178.

Each set 162 may also have one Count indicator 176 to indicate the total number memory locations or registers in the set 162 that contain ECC bits 170. As mentioned, each of the ECC bits 170 (if stored in a particular memory location or register of the set 162) corresponds to an uncompressible data line 138b in the data portion 132 of the memory device 130. Thus, the indication of the number of memory locations or registers in the set 162 containing ECC bits 170 in the Count indicator 176 for all of the sets 162 may be used to track or understand the number of uncompressible data lines 138b in the memory device 130 for which ECC bits 170 are stored in the ECC cache 142 as discussed below.

As illustrated in FIG. 2C, the information about the set 162 may be sent to a tag multiplexor 180a and compared with the tag information 164 in a tag comparator 182a. Similarly, the tags 172 may be sent to a tag multiplexor 180b and also compared to the tag information 164 in tag comparator 182b. The outputs from tag comparator 182a and tag comparator 182b may be used, for example to determine a hit on ECC cache 142 which may result in the generation of a hit/miss signal 184. Similarly, the output from tag comparators 182a and 182b may be used ensure that the appropriate ECC bits 170 for a cache hit are output to the ECC check 146 (See FIGS. 1 and 2B) to perform ECC.

Figure 5:
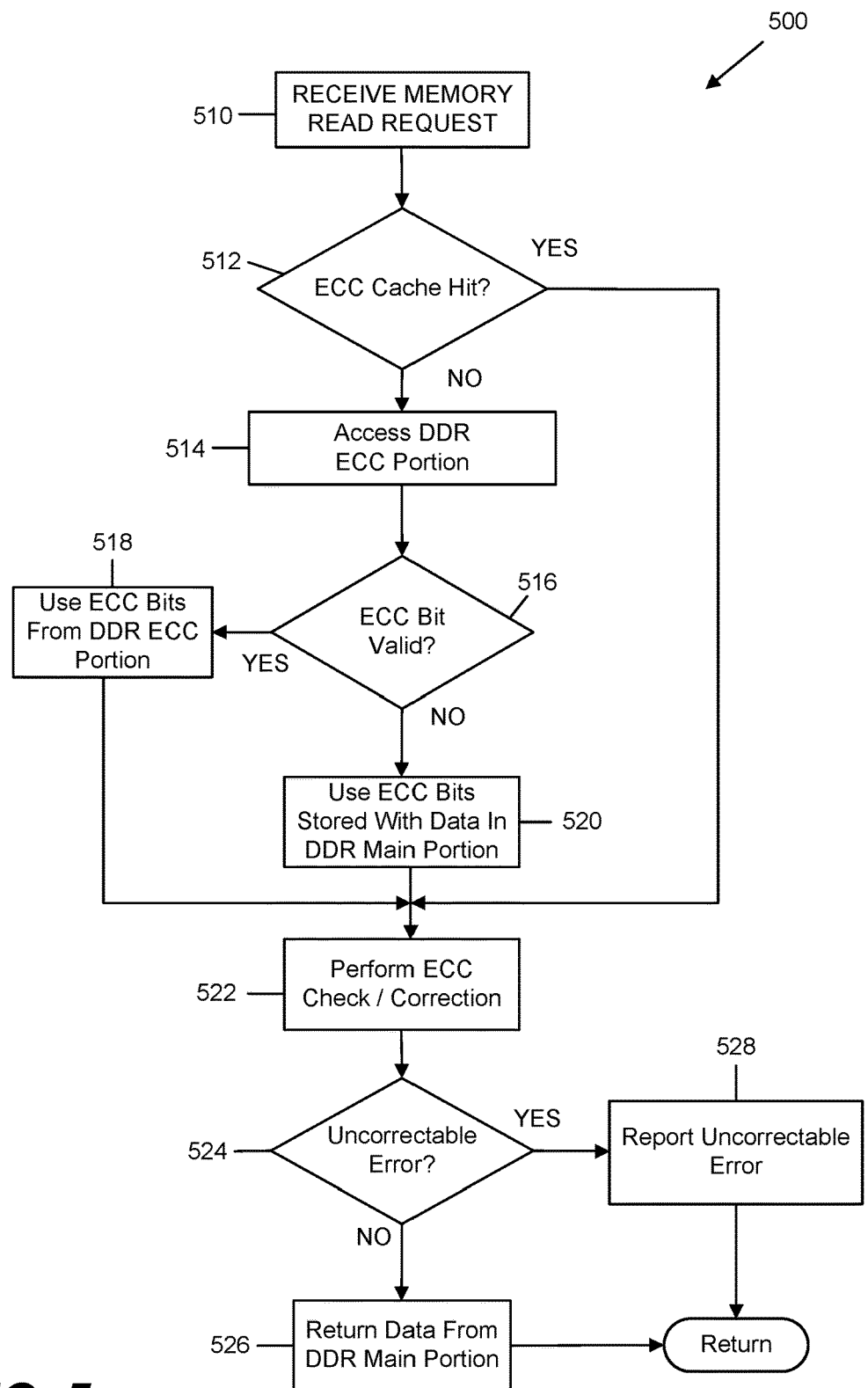
FIG. 5 is a flowchart illustrating an embodiment of a method for retrieving ECC data for a read operation from the memory in communication with the SoC.

FIGS. 4-5 are flowcharts illustrating exemplary embodiments of a method for providing ECC data for a write operation to memory (FIG. 4) and retrieving ECC data for a read operation from the memory (FIG. 5). For the embodiments of FIGS. 4-5, various determinations or decisions may be made as discussed below. The logic 148 illustrated in FIGS. 2A-2B may make these determinations in an embodiment. Logic 148 may be implemented as a single logical component, or separate components, such as "glue logic" that may make one or more of the determinations. In the embodiments discussed below some of these determinations are made based on whether ECC bits or information is stored in the ECC cache 142 (see FIGS. 2A-2B) and/or the ability or capacity of the ECC cache 142 to store ECC bits or information for a particular data line stored in the data portion 132 of the memory device 130.

Such determinations of whether ECC bits (such as ECC bits 170 of FIG. 2C) are stored in the ECC cache 142 may be made by any desired means or method, such as for example by logic 148 or some other component monitoring a hit/miss signal (such as hit/miss signal 184 of FIG. 2C) from ECC cache 142. All such methods or means for determining whether ECC bits are stored in the ECC cache 142 are within the scope of this disclosure. Similarly, determinations whether the ECC cache 142 has the ability or capacity to store ECC bits or information for a data line may be made by any desired means or method.

One exemplary method used for the discussion of FIGS. 4-5 is by using and/or comparing the values:
PHYSICAL_WAY—representing the associativity of the ECC cache 142 across all sets 162 (See FIG. 2C), e.g. a total capacity of the ECC cache 142, such as for example by representing the total or maximum number of ways ECC bits may be written to the ECC cache 142. In the embodiment of the ECC cache 142 illustrated in FIG. 2C, this total/maximum number of ways ECC bits 170 may be written to the ECC cache 142 may be represented by the total number of memory locations in the ECC cache 142 with tags 172 and ECC bits 170, which may depend on the particular implementation of the ECC cache 142 (e.g., the size of the ECC cache 142, the type of memory used to implement the ECC cache 142, etc.);
VALID_WAY—representing a count of how many (the total number) of the ways in the ECC cache 142 to store ECC bits have been taken and/or are in use, e.g., how many of the PHYSICAL_WAY have been taken and/or are in use by storing ECC bits 170. In the embodiment of the ECC cache 142 illustrated in FIG. 2C, the VALID_WAY may be measured or calculated by counting how many of the v bits 174 in the ECC cache have been "set" or turned "on" which may in some embodiments be represented by totaling the Count indicators 176 for each set 162 (See FIG. 2C); and
COUNT—representing the total number of uncompressible data lines stored in the data portion 132 of the memory device 130. By knowing the total number of uncompressible data lines in the data portion 132, the number of associated entries in both the ECC cache 142 and the ECC portion 134 of the memory device 130 is also known. The COUNT may be determined by using the Count indicator 176 of the ECC cache 142 (See FIG. 2C) and/or may be a separate value that is incremented/decremented when an entry is made into/removed from either the ECC cache 142 or the ECC portion 134 of the memory device 130.

One or more of the above values may be maintained, incremented, decremented, and/or measured by logic 148, by another component of the SoC 102, or by one or more separate logical components in varying implementations. Additionally, in other embodiments other values may be used or measured and/or other ways of making the determinations may be implemented.

Turning to FIG. 4, a flowchart of an exemplary embodiment of a method 400 for providing ECC data for a write operation to memory such as memory device 130 is illustrated. Method 400 begins in block 410 where a memory write request is received. As discussed for FIG. 2A, the write request of block 410 may include a write command 202A to the memory controller 120 as well as write data 220A to be written to the memory device 130. In block 412, a determination is made whether the received write data 220A is compressible. This determination may be made for example by compression module 144. As part of making the determination whether the write data 220A is compressible the compression module 144 or another component may send or set a signal or bit to indicate whether or not the write data 220A was compressible.

If the write data 220A is determined as not compressible in block 412, the method 400 continues to block 416 discussed below. If the write data 220A is determined compressible in block 412, the method 400 continues to block 414 where the write data 220A is compressed. Note that in some embodiments block 414 may be combined with block 412 rather than performed as separate blocks or steps.

In block 416, ECC data or bits are generated for the write data 220A (whether compressed or not). The method 400 continues to block 418 where the ECC cache 142 is checked for a cache hit—i.e. ECC bits associated with the received write data 220A. This check in block 418 may be performed by logic 148, and in the embodiment of FIG. 4 is performed even if the write data 220A has been determined to be compressible.

If the ECC cache 142 hits in block 418, the method 400 determines in block 420 whether the write data 220A was compressible. Note that block 420 need not be a separate determination whether the write data 220A is compressible like that performed by the compression module 144. Instead, block 420 may be a check or recognition, such as by logic 148, whether the write data 220A was previously determined compressible. This check or recognition may comprise receiving or monitoring a signal such as from the compression module 144.

If the determination or recognition in block 420 is that the write data 220A is not compressible—i.e., the ECC cache 142 hits in block 418 and the write data 220A is not compressible in block 420—then it is understood the write data 220A was previously written the memory device 130 and has an entry in the ECC cache 142. The method proceeds to block 422 and replaces the ECC bits in the ECC cache 142 for that write data 220A with the newly generated ECC bits for the write data 220A from block 416. The method 400 then returns.

If the determination or recognition in block 420 is that the write data 220A is compressible—i.e., the ECC cache 142 hits in block 418 and the write data 220A is compressible in block 420—it is understood that write data 220A previously determined to be uncompressible is now compressible. The method 400 continues block 424 and invalidates the line in ECC cache 142 associated with the write data 220A. In block 424 the value of COUNT—the total number of uncompressible data lines—is decreased as the number of determined uncompressible data lines has decreased because the line of write data 220A is now compressible.

Additionally, in an embodiment, the value of VALID_WAY—the total of how many of the valid ways in the ECC cache 142 to store ECC bits have been taken—is also decremented in block 424 and the number of "taken" valid ways has decreased by invaliding the ECC cache 142 line associated with the now compressible line of write data 220A. The method 400 then returns.

Returning to block 418, if the ECC cache 142 misses in block 418, the method 400 determines in block 426 whether the write data 220A was compressible. Note that like block 420 discussed above, block 426 need not be a separate determination whether the write data 220A is compressible. Instead, block 426 may be a check or recognition, such as by logic 148, whether the write data 220A was previously determined compressible. If the determination or recognition in block 426 is that the write data 220A is not compressible—i.e., the ECC cache 142 misses in block 418 and the write data 220A is not compressible in block 426—a determination is made in block 428 whether there is capacity in the ECC cache 142 for the newly generated ECC bits (block 416) for the uncompressible write data 220A.

In the embodiment of FIG. 4, the preference is to place as many of the ECC bits for uncompressible data lines into the ECC cache 142 as possible to maximize the number of hits in the ECC cache 142, and to avoid writing (and later reading) ECC bits in the ECC portion 134 of the memory device 130. In this manner, the cost and other advantages of the present systems and methods discussed above may be maximized. Thus, in block 428 a determination is made for the uncompressible write data 220A whether there is still room in the ECC cache 142 to write the ECC bits, or whether existing ECC bits in the ECC cache 142 need to be evicted to the ECC portion 134 of the memory device 130 to free up capacity in the ECC cache 142.

The determination of block 428 may be a single determination, or may comprise multiple determinations or comparisons. In an embodiment the determination of block 428 may be made by making multiple determinations or comparisons of the values of COUNT, PHYSICAL_WAY, and/or VALID_WAY. For example, in an implementation, the determination of block 438 may comprise first comparing the value of COUNT—the total number of uncompressible data lines in the data portion 132 of the memory device 130—to the value of PHYSICAL_WAY—the total number of ways ECC bits may be written to the ECC cache 142. If the value of COUNT is less than the value of PHYSICAL_WAY it is understood or determined that there is available capacity in the ECC cache 142 for the ECC bits associated with the uncompressible write data 220A and no need to evict ECC bits from the ECC cache 142.

If the value of COUNT is greater than or equal to PHYSICAL_WAY, then the value of VALID_WAY is compared to PHYSICAL_WAY. If the value of VALID_WAY is less than PHYSICAL_WAY it is understood or determined that there is still available capacity in the ECC cache 142 for the ECC bits associated with the uncompressible write data 220A, and no need to evict ECC bits from the ECC cache 142.

If, on the other hand, the value of VALID_WAY in the second comparison is greater than or equal to PHYSICAL_WAY it is understood or determined that there is no available capacity in the ECC cache 142 for the ECC bits associated with the uncompressible write data 220A, and there is a need to evict ECC bits from the ECC cache 132 to the ECC portion of the memory device 130.

Regardless of how made, if the determination in block 428 is that there is capacity in the ECC cache 142, the method 400 proceeds to block 430 where the newly generated ECC bits (block 416) for the uncompressible write data 220A are placed into the ECC cache 142. As indicated in block 430, the value of COUNT is incremented to account for the additional identified uncompressible write data 220A. Additionally, in an embodiment, the value of VALID_WAY—the total of how many of the valid ways in the ECC cache 142 to store ECC bits have been taken—is also incremented to account for the new ECC bits that have been stored in the ECC cache 142. The method 400 then returns.

If the determination in block 428 is that there is no capacity in the ECC cache 142, the method 400 proceeds to block 432 where an ECC cache 142 line is evicted from the ECC cache 142 and written as ECC data 136 in the ECC portion 134 of the memory device 130. The ECC bits/ECC cache 142 line to evict may be chosen by any desired means. In an embodiment, the least recently used (LRU) ECC bits/ECC cache line 142 is evicted from the ECC cache and stored in the ECC portion 134; however other methods or algorithms may be used to choose the evicted ECC bits/ECC cache 142 line.

After, the ECC bits are evicted from the ECC cache 142, the newly generated ECC bits (block 416) for the uncompressible write data 220A are written to the ECC cache 142 is discussed in block 430 above. Also like block 430 above, the value of COUNT is incremented to account for the additional identified uncompressible write data 220A. However, unlike block 430 discussed above, the value of VALID_WAY is not incremented because no additional valid ways in the ECC cache 142 to store ECC bits have been taken. Instead, one set of ECC bits has been evicted from the ECC cache 142 and replaced by a more recently used set of ECC bits, leaving the value of VALID_WAY the same. The method 400 then returns.

Returning to block 426, if the determination or recognition is that the write data 220A is not compressible—i.e., the ECC cache 142 misses in block 418 and the write data 220A is compressible in block 426—the method 400 continues to block 434 where a determination is made whether ECC bits associated with the write data 220A are stored in the ECC portion 134 of the memory device 130. This determination in block 418 may be made by any desired means. In an embodiment, the determination of block 418 may comprise first comparing the value of COUNT to VALID_WAY. If the value of COUNT is less than or equal to the value of VALID_WAY it is understood or determined that there is no ECC data 136 at all stored in the ECC portion 134 of the memory device 130. Thus, there is no need to incur the bandwidth cost of accessing the ECC portion 134. If, on the other hand, the value of COUNT is greater than VALID- _WAY, the ECC portion 134 of the memory device 130 is accessed to determine if there is ECC data 136 associated with the compressible write data 220A. In an embodiment, this determination may be made by reading a "valid bit" of the ECC data 136 in the ECC portion 134. If the "valid bit" is set to a predetermined value indicating that the ECC data 136 is "valid" which indicates that there is ECC data 136 in the ECC portion 134 for the compressible write data 220A.

Regardless of how the determination is made, if the determination in block 434 is that no corresponding ECC data 136 is in the ECC portion 134—i.e., the ECC cache 142 hits in block 418, the write data 220A is compressible in block 426, and there is no ECC data 136 in the ECC portion 134 of the memory device 130 for the write data 220A—the method proceeds to block 438 where the generated ECC bits (block 416) are appended to the compressed (block 414) write block 220A as discussed above with respect to FIG. 2A. None of the values of COUNT, VALID_WAY, or PHYSICAL_WAY are increased or decreased in block 438. The method 400 then returns.

If on the other hand, the determination in block 434 is that corresponding ECC data 136 for the write data 220A does exist in the ECC portion 134 of the memory device 130, the method proceeds to block 436, where the ECC data 136 is erased and/or the cache line in the ECC portion 134 is invalidated. Additionally, in block 436, the value COUNT is decreased to reflect the reduction of the number of cache lines in the ECC portion 134 (and the associated reduction of the number of data lines identified as uncompressible). The method 400 then continues to block 438 discussed above.

Turning to FIG. 5, a flowchart of an exemplary embodiment of a method 500 for retrieving ECC data for a read operation from a memory is illustrated. Method 500 begins in block 510 where a memory read request is received. As discussed for FIG. 2B, the memory read request of block 510 may include a read request 202B to the memory controller 120 and/or to the ECC cache 142 or logic 148.

The method 500 continues to block 512 where the ECC cache 142 is checked for a cache hit—i.e. ECC bits associated with the address of received read request 220A. In an embodiment, the determination of block 512 may be made by logic 148 such as by monitoring a hit/miss signal from ECC cache 142, and may determine whether there is a hit in the ECC cache 142 for the memory line 138a, 138b (See FIG. 2B) sought by the memory read request 510. If there is a hit in the ECC cache 142 for ECC bits associated with the memory line sought (line 138b for example) it is understood that the data line 138b is not compressed. As a result of the ECC cache 142 hit, it is also understood that the ECC bits in the ECC cache 142 associated with the memory line 138b may be used, without the need to access the ECC portion 134 of the memory device 130. Thus, if there is an ECC cache 142 hit in block 512, the method 500 skips to block 522 discussed below.

If no ECC cache 142 hit for the memory line sought is determined in block 512, the method proceeds to block 514 and the ECC portion 134 of the memory device 130 is accessed to determine if there is ECC data 136 associated with the memory line 138a, 138b requested by the memory read request (block 510). In the embodiment of FIG. 5, the determination is made in block 516, and may be made by reading a "valid bit" of the ECC data 136 in the ECC portion 134, such as with logic 148. If the "valid bit" is set to a predetermined value indicating that the ECC data 136 is "valid," it indicates that there is ECC data 136 in the ECC portion 134 for the requested memory line. In other embodiments, the determination in block 516 may be made by other methods or means.

If the determination in block 516 is that the ECC bit is "valid," it is known that the memory line 138b for example is not compressed. It is also known as indicated in block 518 that the ECC bits in the ECC portion 134 associated with the memory line 138b may be used. The method 500 proceeds to block 522 discussed below.

If the determination in block 516 is that the ECC bit is not "valid," it is known or understood that there are no ECC bits associated with the memory line, 138a in this example, in either the ECC cache 142 (see block 512) or the ECC portion 134. Thus, it is known or understood that the memory line 138a at the requested address in the data portion 132 of the memory device 130 has been compressed, and the ECC bits appended to the memory line 138a. These ECC bits appended to the memory line 138a may be accessed and used for error correction.

The method 500 proceeds to block 522 where ECC check and/or data correction is performed. In an embodiment, the ECC check and/or data correction of block 522 may be performed by ECC check 146 and data correction 150 of FIG. 2B respectively. If an uncorrectable error is detected in block 524 the uncorrectable error reported in block 528, such as to an interrupt handler of the CPU 106 of the SoC 102 (FIG. 1), and the method 500 returns. Whether an error may be determined uncorrectable in block 522 depends on the implementation. For example, in embodiments of the method 500 and/or system 2B implementing single error correction-double error detection (SEC-DED), a double-bit error would be an uncorrectable error. For embodiments implementing double error correction-triple error detection (DEC-TED), a triple bit error would be an uncorrectable error.

If an uncorrectable error is not determined or detected in block 524, the method continues to block 526 where the retrieved, and if necessary corrected, requested data from the memory device 130 is returned to the requestor (See 220B in FIG. 2B. If the retrieved data was compressed, it will be decompressed, such as by decompression module 144 (See FIG. 2B) before it is returned. If the retrieved data was not compressed, no decompression is necessary. The method 500 then returns.

Figure 6:
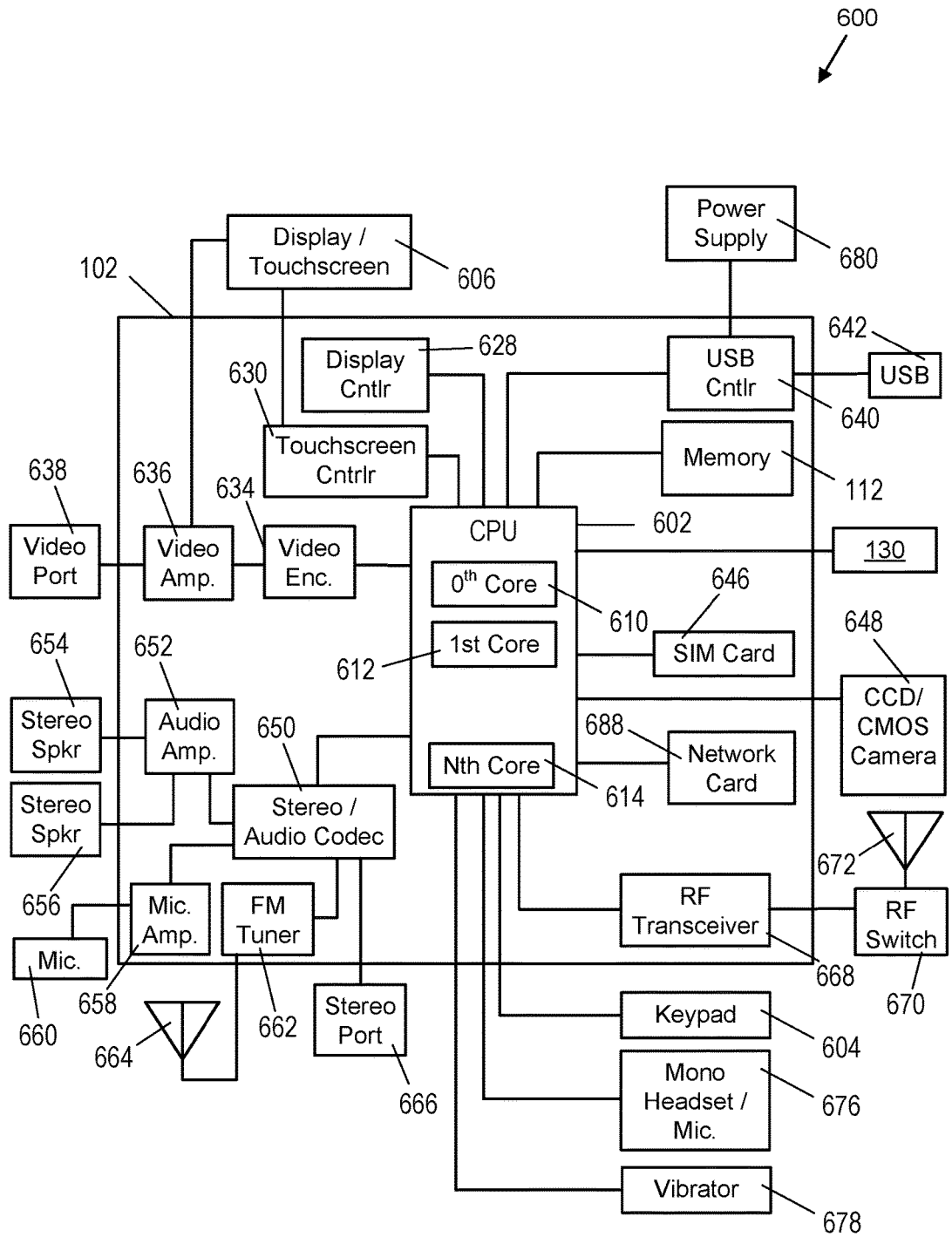
FIG. 6 is a block diagram of an exemplary computing device in which the system of FIG. 1 or method of FIGS. 3-5 may be implemented.

Systems 100 (FIG. 1), 200A (FIG. 2A), and 200B (FIG. 2B), was well as methods 300 (FIG. 3), 400 (FIG. 4) and/or 500 (FIG. 5) may be particularly suited for automotive applications subject to the requirements of ISO 26262 and/or ASIL-A through ASIL-D, as discussed. However, the above systems and methods may be incorporated into or performed by any desired computing system. FIG. 6 illustrates the system 100 incorporated in an exemplary portable computing device (PCD) 600. In this embodiment, the SoC 102 may include a multicore CPU 602. The multicore CPU 602 may include a zeroth core 610, a first core 612, and an Nth core 614. One of the cores may comprise, for example, a graphics processing unit (GPU) with one or more of the others comprising the CPU.

A display controller 628 and a touch screen controller 630 may be coupled to the CPU 602. In turn, the touch screen display 606 external to the on-chip system 102 may be coupled to the display controller 628 and the touch screen controller 630. FIG. 6 further shows that a video encoder 634, e.g., a phase alternating line (PAL) encoder, a sequential color a memoire (SECAM) encoder, or a national television system(s) committee (NTSC) encoder, is coupled to the multicore CPU 602. Further, a video amplifier 636 is coupled to the video encoder 634 and the touch screen display 606.

Also, a video port 638 is coupled to the video amplifier 636. As shown in FIG. 6, a universal serial bus (USB) controller 640 is coupled to the multicore CPU 602. Also, a USB port 642 is coupled to the USB controller 640. Memory 112 and a subscriber identity module (SIM) card 646 may also be coupled to the multicore CPU 602.

Further, as shown in FIG. 6, a digital camera 648 may be coupled to the multicore CPU 602. In an exemplary aspect, the digital camera 648 is a charge-coupled device (CCD) camera or a complementary metal-oxide semiconductor (CMOS) camera.

As further illustrated in FIG. 6, a stereo audio coder-decoder (CODEC) 650 may be coupled to the multicore CPU 602. Moreover, an audio amplifier 652 may be coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation (FM) radio tuner 662 may be coupled to the stereo audio CODEC 650. Also, an FM antenna 664 is coupled to the FM radio tuner 662. Further, stereo headphones 666 may be coupled to the stereo audio CODEC 650.

FIG. 6 further illustrates that a radio frequency (RF) transceiver 668 may be coupled to the multicore CPU 602. An RF switch 670 may be coupled to the RF transceiver 668 and an RF antenna 672. A keypad 604 may be coupled to the multicore CPU 602. Also, a mono headset with a microphone 676 may be coupled to the multicore CPU 602. Further, a vibrator device 678 may be coupled to the multicore CPU 602.

FIG. 6 also shows that a power supply 680 may be coupled to the on-chip system 102. In a particular aspect, the power supply 680 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 688 that may be used to access a data network, e.g., a local area network, a personal area network, or any other network. The network card 688 may be a Bluetooth network card, a WiFi network card, a personal area network (PAN) card, a personal area network ultra-low-power technology (PeANUT) network card, a television/cable/satellite tuner, or any other network card well known in the art. Further, the network card 688 may be incorporated into a chip, i.e., the network card 688 may be a full solution in a chip, and may not be a separate network card 688.

Referring to FIG. 6, it should be appreciated that the memory 130, touch screen display 606, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrator 678, and the power supply 680 may be external to the on-chip system 102 or "off chip."

It should be appreciated that one or more of the method steps described herein may be stored in the memory as computer program instructions. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps or blocks described if such order or sequence does not alter the functionality of the invention. That is, it is recognized that some steps or blocks may performed before, after, or parallel (substantially simultaneously with) other steps or blocks without departing from the scope and spirit of the invention. In some instances, certain steps or blocks may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for implementing error correction control (ECC) in a memory device, the method comprising:
receiving a request at a component of a system on a chip (SoC), to write a data line to a memory device in electrical communication with the SoC;
determining if the received data line is compressible;
determining if there is a hit or a miss for a cache line of an ECC cache of the SoC associated with the received data line; and
responsive to a determination that the received data line is compressible:
compressing the received data line, generating ECC bits based on the compressed data line, appending the ECC bits to the compressed data line, storing the appended compressed data line in a data portion of the memory device, and
responsive to a hit for the ECC cache, deleting the cache line of the ECC cache associated with the received data line, or
responsive to a miss for the ECC cache, determining whether to delete a line of an ECC portion of the memory device and deleting the line of the ECC portion of the memory device in response to a determination to delete the line of the ECC portion of the memory device,
or, responsive to a determination that the received data line is not compressible:
generating ECC bits based on the uncompressed data line, storing the uncompressed data line in the data portion of the memory device, and writing the generated ECC bits to the ECC cache.

2. The method of claim 1, wherein determining whether to delete the line of an ECC portion of the memory device further comprises:
comparing a COUNT representing a number of uncompressed data lines stored in the data portion of the memory device to a VALID_WAY representing a number of memory regions in the ECC cache storing ECC data, wherein if the COUNT is greater than the VALID_WAY the ECC portion of the memory device is checked for a valid bit associated with the received data line.

3. The method of claim 2, wherein responsive to the valid bit being located in the ECC portion, a cache line of the ECC portion associated with the valid bit is deleted and the COUNT is decreased.

4. The method of claim 1, wherein writing the generated ECC bits to the ECC cache further comprises:
responsive to a hit for the ECC cache, replacing the cache line of the ECC cache with the generated ECC bits, or
responsive to a miss for the ECC cache, determining whether if the ECC cache is full.

5. The method of claim 4, wherein determining if the ECC cache is full further comprises:
determining whether a COUNT representing a number of uncompressed data lines stored in the data portion of the memory device is less than a PHYSICAL_WAY representing a maximum number of memory regions in the ECC cache for storing data ECC data.

6. The method of claim 5, further comprising:
responsive to a determination that COUNT is less than PHYSICAL_WAY, writing the generated ECC bits to the ECC cache and incrementing the COUNT and the PHYSICAL_WAY, or
responsive to a determination that the COUNT is equal to or greater than the PHYSICAL_WAY, comparing the VALID_WAY to the PHYSICAL_WAY.

7. The method of claim 6, further comprising:
responsive to a determination that the VALID_WAY is less than the PHYSICAL_WAY, writing the generated ECC bits to the ECC cache and incrementing the COUNT and the PHYSICAL_WAY, or
responsive to a determination that the VALID_WAY is greater than or equal to the PHYSICAL_WAY, evicting a second cache line of the ECC cache to the ECC portion of the memory device, writing the generated ECC bits to the ECC cache, and incrementing the COUNT.

8. The method of claim 7, wherein the second cache line is a least recently used (LRE) cache line.

9. The method of claim 1, further comprising:
receiving a read request at a component of the SoC for a stored data line in the data portion of the memory device;
determining if there is a read hit or a read miss for the ECC cache associated with an address of the stored data line; and
responsive to a read hit for the ECC cache, using an ECC data in the ECC cache associated with the address of the stored data line for an ECC check of the stored data line, or
responsive to a read miss for the ECC cache, checking the ECC portion of the memory device for a valid bit associated with the stored data line, wherein
responsive to the valid bit being located in the ECC portion, using an ECC data in the ECC portion of the memory device for the ECC check, or
responsive to the valid bit not being located in the ECC portion, using an ECC data appended to the stored data line for the ECC check and decompressing the stored data line.

10. The method of claim 1, wherein the request to write the data line is received from a cache of the SoC and the received data line comprises a 128 bit, 64 bit, 32 bit, 16 bit, or 8 bit cache line.

11. A system for implementing error correction control (ECC) in a memory device, the system comprising:
means for receiving a request at a component of a system on a chip (SoC), to write a data line to a memory device in electrical communication with the SoC;
means for determining if the received data line is compressible;
means for determining if there is a hit or a miss for a cache line of an ECC cache of the SoC associated with the received data line;
means for compressing the received data line that is responsive to a determination that the received data line is compressible;
means for generating ECC bits based on the compressed data line;
means for appending the ECC bits to the compressed data line;
means for storing the appended compressed data line in a data portion of the memory device;
means for deleting the cache line of the ECC cache associated with the received data line that is responsive to a hit for the ECC cache;
means for determining whether to delete a line of an ECC portion of the memory device that is responsive to a miss for the ECC cache and deleting the line of the ECC portion of the memory device in response to a determination to delete the line of the ECC portion of the memory device;

means for generating ECC bits based on the uncompressed data line that is responsive to a determination that the received data line is not compressible;

means for storing the uncompressed data line in the data portion of the memory device that is responsive to a determination that the received data line is not compressible: and means for writing the generated ECC bits to the ECC cache that is responsive to a determination that the received data line is not compressible.

12. The system of claim 11, wherein the means for determining whether to delete the line of an ECC portion of the memory device further comprises:

means for comparing a COUNT representing a number of uncompressed data lines stored in the data portion of the memory device to a VALID_WAY representing a number of memory regions in the ECC cache storing ECC data, wherein if the COUNT is greater than the VALID_WAY the ECC portion of the memory device is checked for a valid bit associated with the received data line.

13. The system of claim 12, further comprising: means for deleting a cache line of the ECC portion associated with the valid bit that is responsive to the valid bit being located in the ECC portion and means for decreasing the COUNT.

14. The system of claim 11, wherein the means for writing the generated ECC bits to the ECC cache further comprises:

means for replacing the cache line of the ECC cache with the generated ECC bits that is responsive to a hit for the ECC cache; and means for determining whether if the ECC cache is full that is responsive to a miss for the ECC cache.

15. The system of claim 14, wherein the means for determining if the ECC cache is full further comprises:

means for determining whether a COUNT representing a number of uncompressed data lines stored in the data portion of the memory device is less than a PHYSICAL_WAY representing a maximum number of memory regions in the ECC cache for storing data ECC data.

16. The system of claim 15, further comprising:

means for writing the generated ECC bits to the ECC cache and incrementing the COUNT and the PHYSICAL_WAY that is responsive to a determination that the COUNT is less than the PHYSICAL_WAY; and means for comparing a VALID_WAY to the PHYSICAL_WAY that is responsive to a determination that the COUNT is equal to or greater than the PHYSICAL_WAY.

17. The system of claim 16, further comprising:

means for writing the generated ECC bits to the ECC cache and incrementing the COUNT and the PHYSICAL_WAY that is responsive to a determination that the VALID_WAY is less than the PHYSICAL_WAY;

means for evicting a second cache line of the ECC cache to the ECC portion of the memory device that is responsive to a determination that the VALID_WAY is greater than or equal to the PHYSICAL_WAY;

means for writing the generated ECC bits to the ECC cache that is responsive to a determination that the VALID_WAY is greater than or equal to the PHYSICAL_WAY; and means for incrementing the COUNT that is responsive to a determination that the VALID_WAY is greater than or equal to the PHYSICAL_WAY.

18. The system of claim 17, wherein the second cache line is a least recently used (LRE) cache line.

19. The system of claim 11, further comprising:

means for receiving a read request at a component of the SoC for a stored data line in the data portion of the memory device;

means for determining if there is a read hit or a read miss for the ECC cache associated with an address of the stored data line;

means for using an ECC data in the ECC cache associated with the address of the stored data line for an ECC check of the stored data line that is responsive to a read hit for the ECC cache;

means for checking the ECC portion of the memory device for a valid bit associated with the stored data line that is responsive to a read miss for the ECC cache;

means for using an ECC data in the ECC portion of the memory device for the ECC check that is responsive to the valid bit being located in the ECC portion; and means for using an ECC data appended to the stored data line for the ECC check and decompressing the stored data line that is responsive to the valid bit not being located in the ECC portion.

20. The system of claim 11, wherein the request to write the data line is received from a cache of the SoC and the received data line comprises a 128 bit, 64 bit, 32 bit, 16 bit, or 8 bit cache line.

21. A computer implemented system for providing error correction control (ECC) in a memory device, the system comprising:

a processor operable for:

receiving a request from a system on a chip (SoC), to write a data line to a memory device in electrical communication with the SoC;

determining with a processor if the received data line is compressible;

determining if there is a hit or a miss for a cache line of an ECC cache of the SoC associated with the received data line;

compressing the received data line responsive to a determination that the received data line is compressible, generating ECC bits based on the compressed data line, appending the ECC bits to the compressed data line, storing the appended compressed data line in a data portion of the memory device, deleting the cache line of the ECC cache associated with the received data line responsive to a hit for the ECC cache;

determining whether to delete a line of an ECC portion of the memory device responsive to a miss for the ECC cache and deleting the line of the ECC portion of the memory device in response to a determination to delete the line of the ECC portion of the memory device;

generating ECC bits based on the uncompressed data line responsive to a determination that the received data line is not compressible, storing the uncompressed data line in the data portion of the memory device, and writing the generated ECC bits to the ECC cache.

22. The system of claim 21, wherein the processor determining whether to delete the line of an ECC portion of the memory device further comprises:

the processor operable for comparing a COUNT representing the number of uncompressed data lines stored in the data portion of the memory device to a VALID_WAY representing a number of memory regions in the ECC cache storing ECC data, wherein if the COUNT is greater than the VALID_WAY the ECC portion of the memory device is checked for a valid bit associated with the received data line.

23. The system of claim 22, wherein the processor is operable for deleting a cache line of the ECC portion associated with the valid bit responsive to the valid bit being located in the ECC portion and decreasing the COUNT.

24. The system of claim 23, wherein the processor operable for writing the generated ECC bits to the ECC cache further comprises:

the processor operable for replacing the cache line of the ECC cache with the generated ECC bits responsive to a hit for the ECC cache; and the processor operable for determining whether if the ECC cache is full responsive to a miss for the ECC cache.

25. The system of claim 24, wherein the processor operable for determining if the ECC cache is full further comprises:

the processor determining whether the COUNT is less than a PHYSICAL_WAY representing a maximum number of memory regions in the ECC cache for storing data ECC data.

26. A computer program product comprising a non-transitory computer usable medium having a computer readable program code embodied therein, said computer readable program code adapted to be executed provide error correction control (ECC) in a memory device, the method comprising:

receiving a request at a component of a system on a chip (SoC), to write a data line to a memory device in electrical communication with the SoC;

determining if the received data line is compressible;

determining if there is a hit or a miss for a cache line of an ECC cache of the SoC associated with the received data line; and responsive to a determination that the received data line is compressible:

compressing the received data line, generating ECC bits based on the compressed data line, appending the ECC bits to the compressed data line, storing the appended compressed data line in a data portion of the memory device, and responsive to a hit for the ECC cache, deleting the cache line of the ECC cache associated with the received data line, or responsive to a miss for the ECC cache, determining whether to delete a line of an ECC portion of the memory device and deleting the line of the ECC portion of the memory device in response to a determination to delete the line of the ECC portion of the memory device, or, responsive to a determination that the received data line is not compressible:

generating ECC bits based on the uncompressed data line, storing the uncompressed data line in the data portion of the memory device, and writing the generated ECC bits to the ECC cache.

27. The computer program product of claim 26, wherein determining whether to delete the line of an ECC portion of the memory device further comprises:

comparing a COUNT representing a number of uncompressed data lines stored in the data portion of the memory device to VALID_WAY representing a number of memory regions in the ECC cache storing ECC data, wherein if the COUNT is greater than the VALID_WAY the ECC portion of the memory device is checked for a valid bit associated with the received data line.

28. The computer program product of claim 27, wherein responsive to the valid bit being located in the ECC portion, a cache line of the ECC portion associated with the valid bit is deleted and the COUNT is decreased.

29. The computer program product of claim 26, wherein writing the generated ECC bits to the ECC cache further comprises:

responsive to a hit for the ECC cache, replacing the cache line of the ECC cache with the generated ECC bits, or responsive to a miss for the ECC cache, determining whether if the ECC cache is full.

30. The computer program product of claim 29, wherein determining if the ECC cache is full further comprises:

determining whether a COUNT representing a number of uncompressed data lines stored in the data portion of the memory device is less than a PHYSICAL_WAY representing a maximum number of memory regions in the ECC cache for storing data ECC data.

* * * * *